United States Patent [19]
Smith et al.

[11] Patent Number: 5,876,176
[45] Date of Patent: *Mar. 2, 1999

[54] STOWAGE LATCH ASSEMBLY FOR AUGER

[75] Inventors: David R. Smith; Michael J. Hilvers, both of Fort Jennings; Kenneth L. Bellmann, Ottawa, all of Ohio

[73] Assignee: Unverferth Manufacturing Co., Inc., Kalida, Ohio

[*] Notice: This patent issued on a continued prosecution application filed under 37 CFR 1.53(d), and is subject to the twenty year patent term provisions of 35 U.S.C. 154(a)(2).

[21] Appl. No.: 644,898

[22] Filed: May 10, 1996

[51] Int. Cl.$^6$ ........................................................ B60P 1/42
[52] U.S. Cl. .......................... 414/523; 414/526; 198/320; 198/861.4
[58] Field of Search ...................................... 414/503, 504, 414/505, 523, 526; 292/203, 210; 224/405, 548, 549, 552, 553, 570; 198/313, 320, 538, 632, 668, 861.4

[56] References Cited

U.S. PATENT DOCUMENTS

| | | |
|---|---|---|
| 2,507,873 | 5/1950 | Ward . |
| 2,541,984 | 2/1951 | Chandler . |
| 3,057,522 | 10/1962 | Reed . |
| 3,498,483 | 3/1970 | Meharry .................................. 414/523 |
| 3,521,768 | 7/1970 | Rohwedder .............................. 414/523 |
| 3,638,816 | 2/1972 | Mann .................................. 414/526 X |
| 3,721,359 | 3/1973 | Howell et al. ........................... 414/505 |
| 3,802,612 | 4/1974 | Smith ..................................... 224/552 X |
| 3,834,564 | 9/1974 | Laurent et al. ....................... 198/538 X |
| 3,877,624 | 4/1975 | Carson ................................. 224/570 X |
| 4,390,094 | 6/1983 | Schoeneberger ..................... 414/526 X |
| 4,391,363 | 7/1983 | Waldrop ............................... 414/526 X |
| 4,391,364 | 7/1983 | Young et al. ........................ 414/526 X |
| 4,427,105 | 1/1984 | Hawley et al. ....................... 414/523 X |
| 4,613,275 | 9/1986 | Karlowsky . |
| 5,009,254 | 4/1991 | Bruner . |

OTHER PUBLICATIONS

"M&W Little Red Wagon", M&W Gear Company, Gibson City, IL 60936, undated.
"Gravity Box/Tailgate Auger", United Farm Tools, Inc., South Charleston, WV 25309, undated.
"Killbros Hydraulic Auger Conveyors", Kill Brothers Co., Delphos, OH 45833, undated.
"Westfield Utility Augers", Westfield Industries, Inc., Rosenort, Manitoba, Canada R0G 1W0 (1988).
"J&M Hydraulic Auger", J&M Manufacturing Company, Ft. Recovery, OH 45846, undated.
"J&M Uni–swivel Hydraulic Augers", J&M Manufacturing Company, Ft. Recovery, OH 45846, undated.
"J&M Hydraulic Augers", J&M Manufacturing Company, Ft. Recovery, OH 45846, undated.
"Hydra", Hydra–Fold Auger, Inc., Paxton, IL 60957, undated.
"Unverferth Grain Handling Systems", Unverferth Manufacturing Company, Inc., Kalida, OH 45853, undated.

*Primary Examiner*—James W. Keenan
*Attorney, Agent, or Firm*—Rothwell, Figg, Ernst & Kurz, p.c.

[57] ABSTRACT

A stowage latch assembly for an auger includes a hopper for holding granular material and an auger barrel which is swingably movable in an auger-stowing path from a hopper-unloading position, where the auger barrel extends outwardly from the hopper, to an auger-stowage position, where the auger is positioned adjacent a sidewall of the hopper. An auger-latching support assembly is provided, which includes a gate member openable for receiving the auger barrel when the barrel is moved from the hopper-unloading position to the auger-stowage position. The gate member is locked in a closed position when the auger is in the stowage position.

5 Claims, 5 Drawing Sheets

STOWAGE LATCH ASSEMBLY FOR AUGER

BACKGROUND OF THE INVENTION

1. Field of the Invention

The present invention relates to an auger assembly movable from a hopper-unloading position to an auger-stowage position.

2. Description of the Background Art

It is known to mount an auger on an agricultural grain gravity box so as to provide an auger-unloadable grain cart or wagon. With such grain carts, the augers can be made movable from a hopper-unloading position to an auger-stowage transport position.

In the past, the operator was required to simultaneously operate a winch and position the auger above a transport bracket. Then, while holding the auger in place with one hand, the operator would lower the auger into the bracket utilizing the winch with the other hand.

There remains a need in the art for improvements in stowage latch assemblies for augers.

SUMMARY OF THE INVENTION

In accordance with the present invention, a stowage latch assembly for an auger includes a hopper for holding granular material, and an auger having an auger barrel movable in an auger-stowing path from a hopper-unloading position, wherein the auger extends outwardly from the hopper, to an auger-stowage position, wherein the auger is positioned adjacent a sidewall of the hopper. An auger-latching support assembly is provided which includes a gate member which is openable for receiving the auger barrel when the barrel is moved from the hopper-unloading position to the auger-stowage position, wherein the gate member is locked in a closed position when the auger is in the stowage position.

DETAILED DESCRIPTION OF THE PREFERRED EMBODIMENTS

Figure 1:
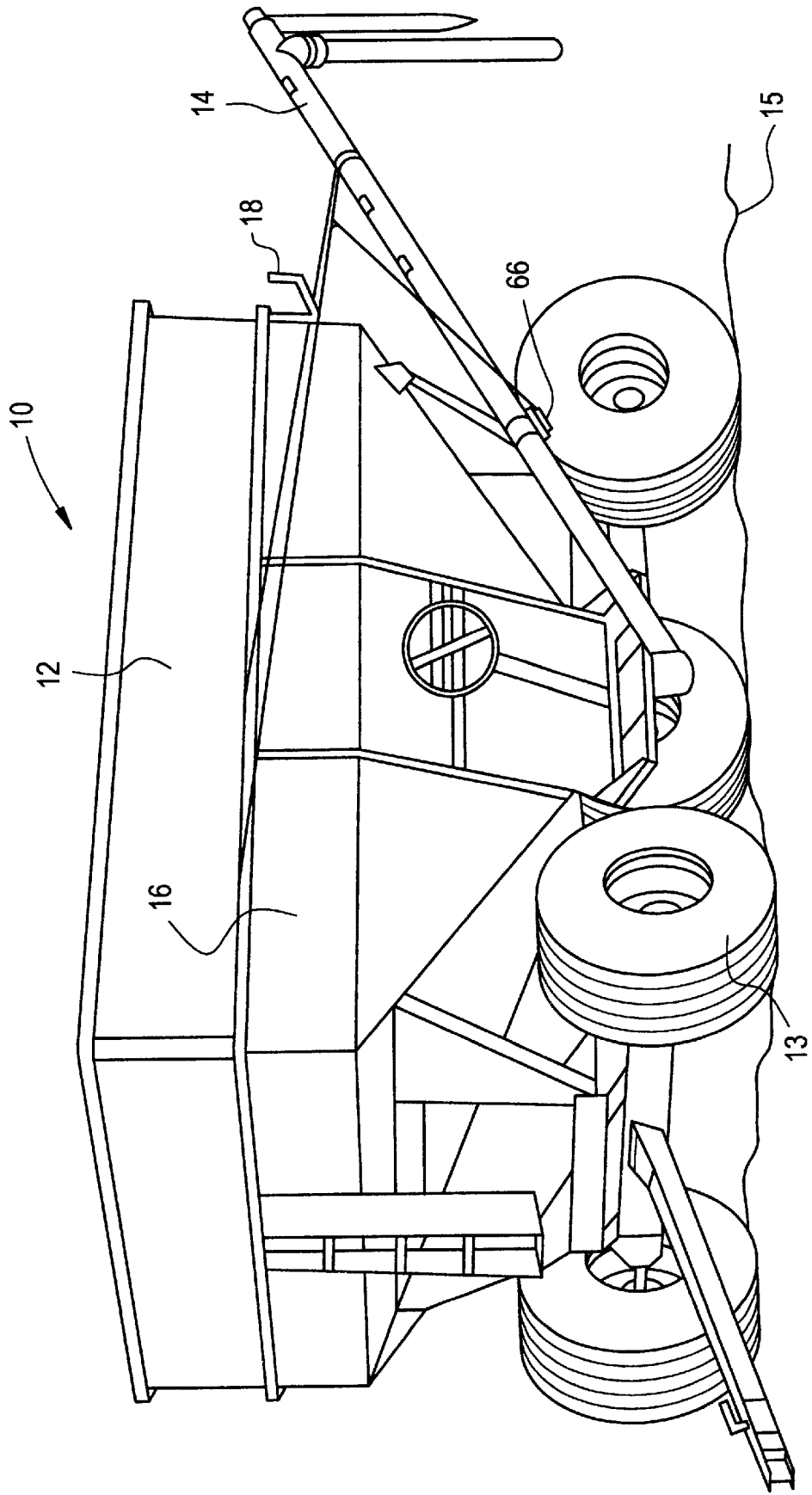
FIG. 1 is a perspective view of a gravity box grain cart to which the present invention is applicable, with an auger barrel in a hopper-unloading position.

FIG. 1 shows a gravity box grain cart or wagon 10 to which the present invention is applicable. Wagon 10 includes a hopper 12 for holding granular material such as grain.

Figure 2:
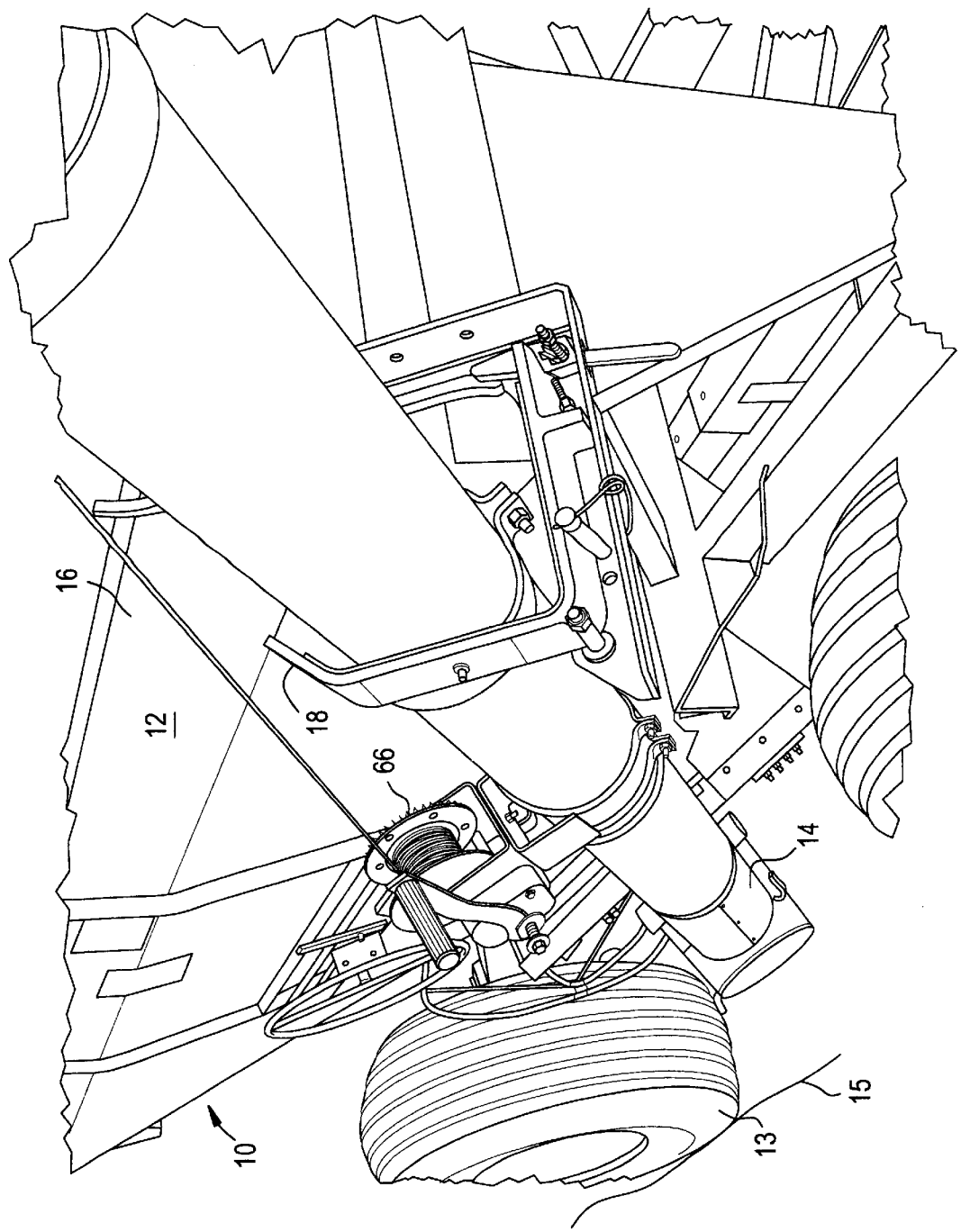
FIG. 2 is a perspective view, with portions broken away, of a gravity box grain cart, or wagon, with auger barrel in an auger-stowage position and an auger-latching support assembly for the auger locked in a closed position.

Wagon 10 has an auger including auger barrel 14 which is swingably movable in an auger-stowing path from the hopper-unloading position of FIG. 1, wherein the auger barrel 14 extends outwardly from hopper 12, to an auger-stowage transport position shown in FIG. 2, wherein the auger barrel 14 is positioned adjacent a sidewall 16 of hopper 12.

Wheels 13 are connected to hopper 12 for transporting wagon 10 over a surface 15.

As shown in FIG. 2, an auger-latching support assembly 18 is provided in accordance with the present invention.

Figure 3:
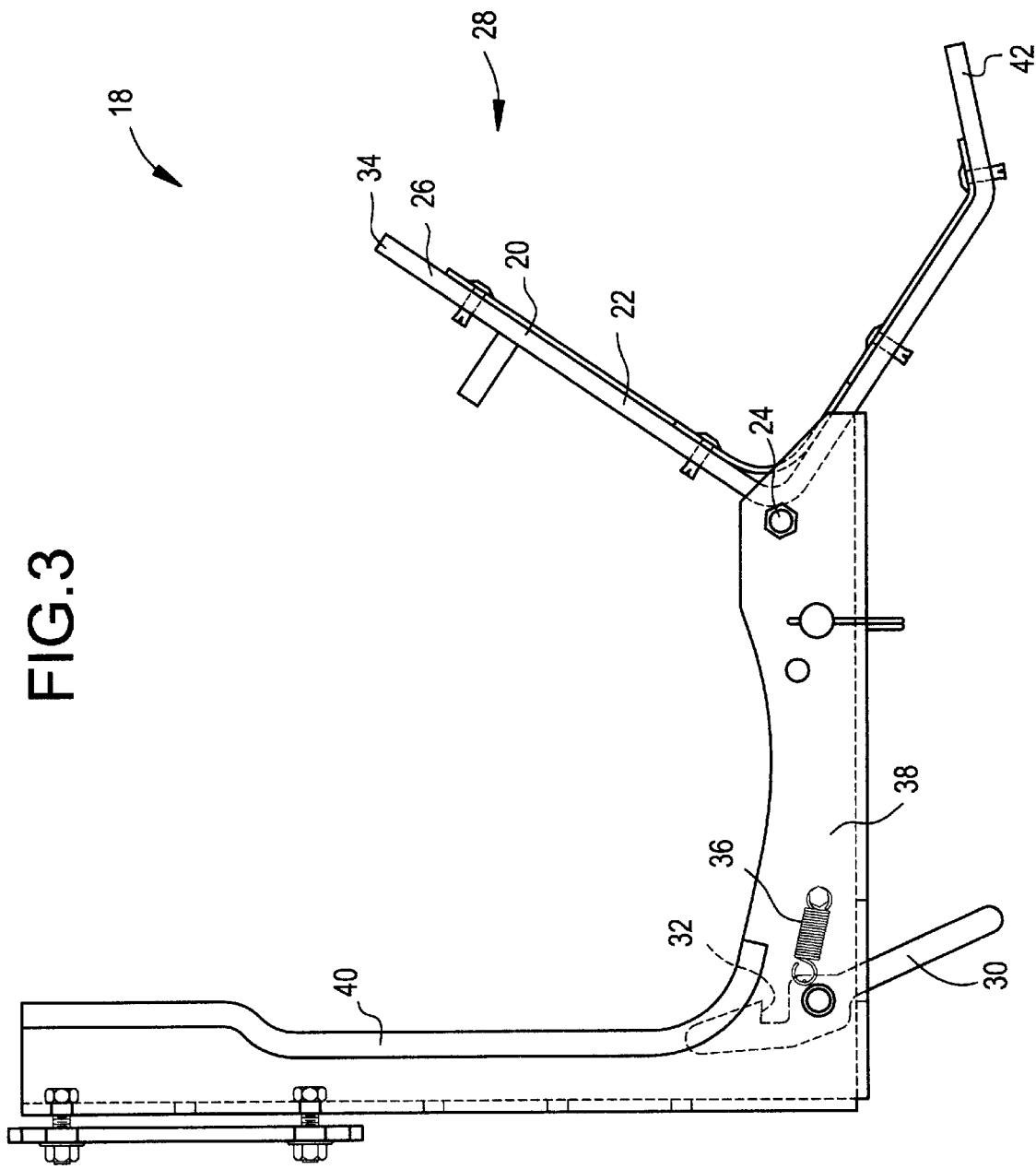
FIG. 3 is a front elevational view of an auger-latching support assembly in accordance with the invention, in an open position, ready to receive an auger.

With reference to FIG. 3, the auger-latching support assembly 18 includes a gate member 20 which is openable, and shown in the open position in FIG. 3, for receiving an auger barrel 14 when barrel 14 is moved from the hopper-unloading position shown in FIG. 1 to the auger-stowage position shown in FIG. 2.

As shown in FIG. 3, gate member 20 has an L-shaped portion 22 which is movable about a pivot 24. The L-shaped portion 22 of gate member 20 has a first leg 26 which is positioned in the auger-stowing path, represented by arrow 28 in FIG. 3, when gate member 20 is in the open position prior to receiving the auger barrel (not shown in FIG. 3).

Figure 4:
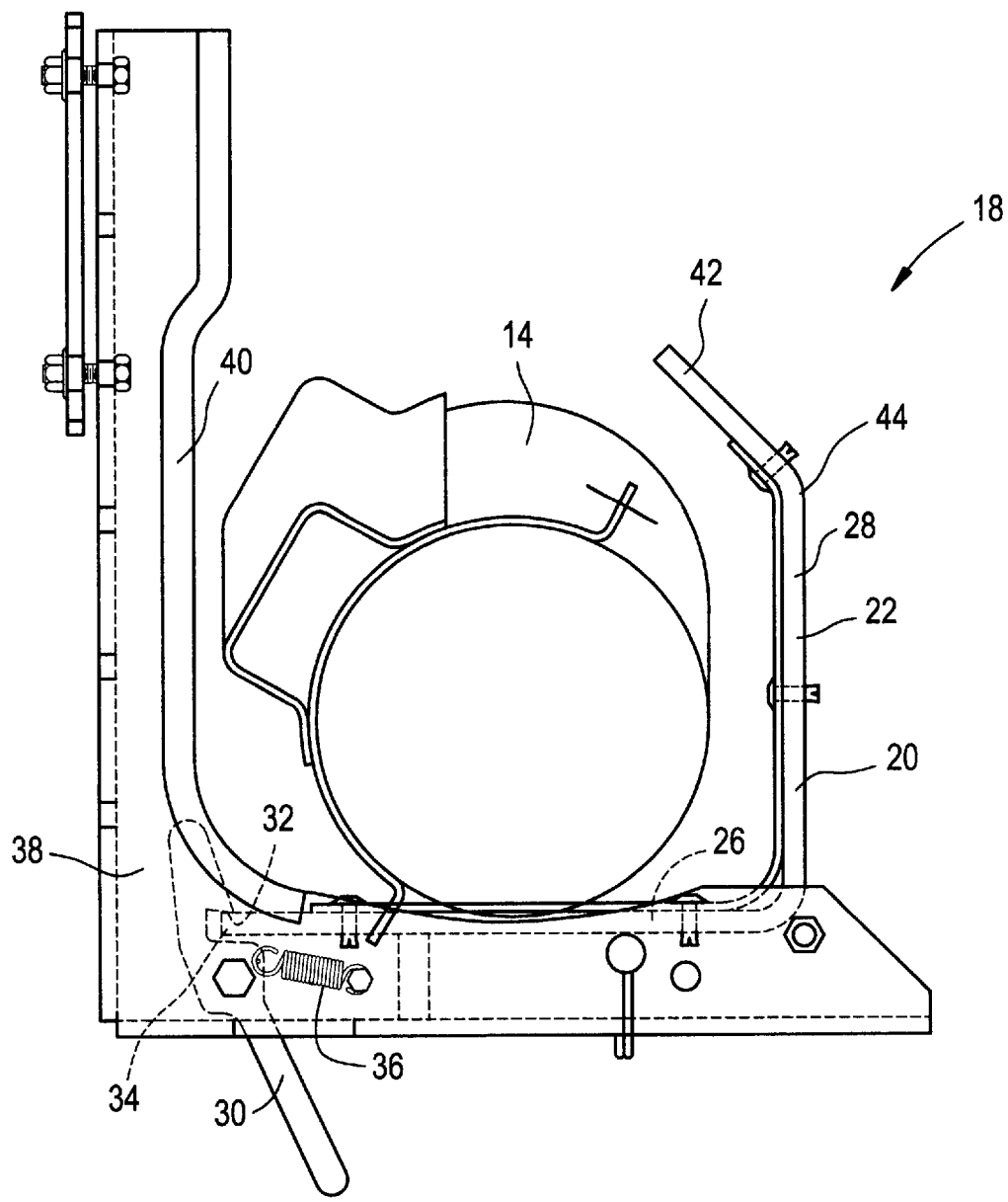
FIG. 4 is a front elevational view of the auger-latching support assembly of FIG. 3, shown in a locked position about an auger barrel, with portions of the auger barrel removed for clarity.

When auger barrel 14 is moved into the stowage and transport position shown in FIG. 4, the auger barrel 14 contacts the first leg 26 of gate member 20 and moves the L-shaped portion 22 from the open position shown in FIG. 3 into the locked position shown in FIG. 4.

When the L-shaped portion 22 is in the locked position shown in FIG. 4, a second leg 28 of the L-shaped portion 22 locks the auger barrel 14 in the stowage and transport position shown in FIG. 4. Thus, the L-shaped portion 22 is pivotable between the open position shown in FIG. 3 and the locked position shown in FIG. 4. The wagon 10 is transported when the auger barrel 14 is in the locked, stowage position shown in FIG. 2.

Figure 5:
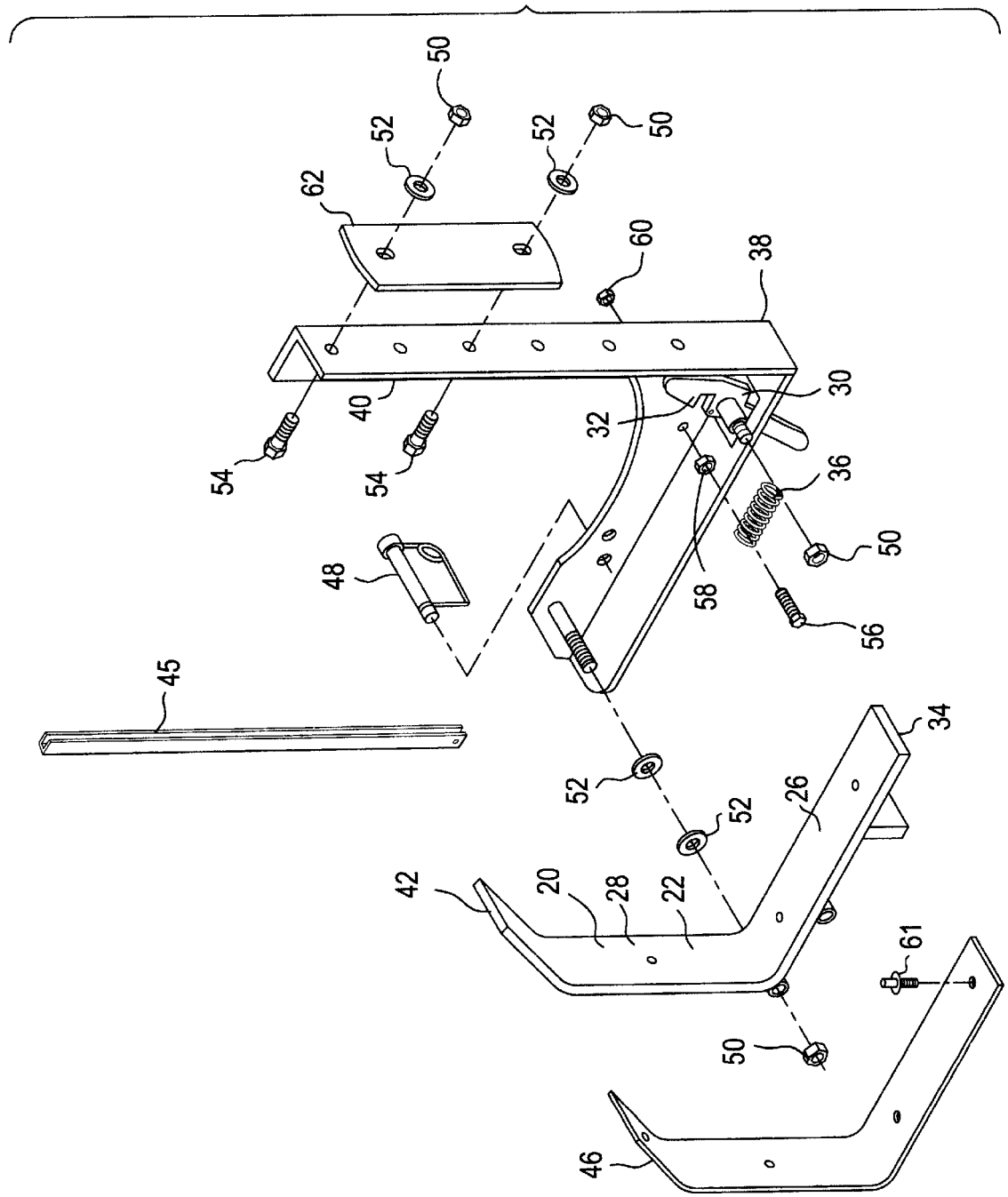
FIG. 5 is an exploded perspective view of the auger-latching support assembly of FIG. 3.

As shown in FIGS. 3, 4 and 5, the auger-latching support assembly includes a releasable latch 30 having a tooth 32 which engages an end 34 of gate member 20 for selectively holding the gate member 20 in the locked position shown in FIG. 4.

The auger-latching support assembly 18 further includes a spring 36 connected to latch 30 and to bracket weldment 38, for biasing latch 30 toward the locked position.

In the embodiments shown, the auger-latching support assembly 18 includes a fixed keeper side member 40. As shown in FIG. 4, the fixed keeper side member 40 is positioned opposite the second leg 28 in the locked position, so that the fixed keeper side member 40, the first leg 26 and the second leg 28 form a generally U-shaped assembly for holding auger barrel 14 in the stowage and transport position.

In the embodiment shown, the second leg 28 has a lip member 42 extending from an end 44 of the second leg 28 opposite first leg 26, so that the lip member 42 extends over auger barrel 14 in the locked position.

With reference to FIG. 5, the auger-latching support assembly shown includes a U-channel member 45 which is press-fitted over fixed keeper side member 40. Also provided is a rubber strap padding member 46 which is attached to gate member 20. A snap pin 48 is provided for supporting the gate member 20 in the locked position. The auger-latching support assembly 18 is assembled and mounted on hopper 12 utilizing lock nuts 50, washers 52, cap screws 54, cap screw 56, hex nut 58, lock nut 60, rivet 61 and support plate 62.

An auger-latching support assembly 18 can be mounted to the hopper or wagon in any suitable position, at the front or rear thereof, or both.

In operation, the invention requires only that the operator raise the auger to a transport height with winch 66 shown in FIG. 2. The operator then is able to swing the auger to the auger transport-stowage position, and into the auger-latching support assembly which then locks automatically.

Because many modifications, variations and changes in detail may be made to the described embodiments, it is intended that all matter in the foregoing description and shown in the accompanying drawings be interpreted as illustrative and not in a limiting sense.

We claim:

1. A stowage latch assembly for an auger, comprising:
   a) a hopper for holding granular material;
   b) an auger barrel movable in an auger-stowing path from a hopper-unloading position, wherein the auger barrel extends outwardly from said hopper, to an auger-stowage position, wherein the auger barrel is positioned adjacent a sidewall of said hopper; and
   c) an auger-latching support assembly including a pivoting gate member which is openable for receiving the auger barrel when the auger barrel is moved from the hopper-unloading position to the auger-stowage position and a releasable latch, said gate member having an L-shaped portion with a first leg that is positioned in the auger-stowing path when said gate member is in an open position prior to receiving said auger barrel, said gate member being automatically pivoted into a closed position and locked as the auger barrel is moved into said stowage position by the auger barrel contacting said first leg and causing said gate member to pivot until said releasable latch engages said first leg to lock said gate member,
   said L-shaped portion having a second leg which pivots into position to lock the auger barrel in said auger-stowage position as said gate member pivots.

2. The assembly of claim 1, further including a spring connected to said latch for biasing said latch toward said locked position.

3. The assembly of claim 1, wherein said auger-latching support assembly includes a fixed keeper side member positioned opposite said second leg in said closed position, and wherein, in said closed position, the fixed keeper side member, the first leg and the second leg form a U-shaped assembly for holding the auger barrel in the storage position.

4. The assembly of claim 3, wherein the second leg has a lip member extending from an end of the second leg opposite the first leg, the lip member extending over the auger barrel in said closed position.

5. The assembly of claim 1, wherein said hopper is positioned on a cart and said cart is transportable when said auger barrel is in said stowage position.

* * * * *